Patented Mar. 7, 1939

2,150,123

UNITED STATES PATENT OFFICE 2,150,123

CYCLIC PROCESS FOR THE PRODUCTION OF NITROPARAFFINS

Jerome Martin and Edward B. Hodge, Terre Haute, Ind., assignors to Commercial Solvents Corporation, Terre Haute, Ind., a corporation of Maryland No Drawing. Application January 28, 1938, Serial No. 187,407

8 Claims. (Cl. 260—644)

Our invention relates to a process for the production of nitroparaffins by the vapor phase nitration of paraffin hydrocarbons and, more particularly, to an improved process of this nature in which unreacted materials are recycled.

The nitration of paraffin hydrocarbons such as ethane, propane, butane and the like, is most advantageously carried out in a continuous vapor phase process, as described in U. S. Patents 1,967,667 and 2,071,122 of H. B. Hass, et al. In accordance with this process, gaseous hydrocarbons and nitric acid vapors, or nitrogen dioxide, are reacted in a heated reaction chamber to produce nitroparaffins. It has been suggested in the patents of Hass, et al that this process may be operated in a cyclic manner by removing nitroparaffins from the reaction products by condensation, converting the oxides of nitrogen to nitric acid, and recycling the remaining gases. We have found, however, that when operating in accordance with this procedure, the conversions secured during recycling are much lower than can be obtained with fresh reactants, especially when calculated on the basis of the nitric acid introduced; and that both the conversions and yields, based on the recycled hydrocarbons, are substantially lower than can be obtained with fresh hydrocarbons.

We have now found that one of the controlling causes of these lower yields and conversions is the presence of normally liquid, water soluble materials, especially aldehydes and ketones, in the reaction products. We have found that such materials persist in the exit gases after condensation to remove nitroparaffins, and even after treatment with alkali solution to remove unreacted nitric acid, but that such materials can be entirely removed by an efficient scrubbing of the gases with water or other aqueous media. We have further found that the removal of these materials, and particularly aldehydes and ketones, is facilitated by the use of a relatively strong acid solution for scrubbing the gases. Sulfuric acid scrubbing is particularly efficient in this respect, but the removal of all of the aldehydes and ketones by this method consumes a considerable amount of sulfuric acid, and for economical reasons we therefore prefer to employ a combination of water scrubbing and sulfuric acid scrubbing.

We have found that aldehydes and ketones are present in the reaction products of the nitration reaction in concentrations as high as 4 gm. moles per 100 cu. ft. of the exit gases, even after condensation at 15° C. and 30 lbs. per sq. in. pressure to remove nitroparaffins and other normally liquid reaction products. The aldehydes and ketones which are present constitute those having the same number of carbon atoms as the paraffin hydrocarbon being nitrated, and usually all of the lower homologues of such compounds. On recycling such materials in the nitration process, nitric acid is preferentially consumed in the oxidation of these materials, rather than in the nitration reaction. Since a higher molar ratio of nitric acid is required for this type of reaction than for nitration, it may readily be seen that the presence of even less than 1%, by volume, of aldehyde and ketone vapors in the gases being recycled can account for greatly diminished conversions in the nitration reaction.

In the operation of our process, the reaction products, after removal of the nitroparaffins, are contacted with the aqueous scrubbing medium in any suitable apparatus for contacting gases with liquids. Packed columns, bubble cap columns and other known apparatus for this purpose may be satisfactorily employed. Duplicate scrubbing apparatus may be employed alternately to secure continuous operation, but this is more efficiently secured by continuously passing the gases countercurrent to the scrubbing liquid, which is likewise continuously introduced into the apparatus.

The amount of scrubbing liquid required, per unit volume of gas, will of course depend upon the initial concentration of water soluble materials in the gases and upon the efficiency of contact between the gases and liquid secured in the apparatus. When water alone is employed as the scrubbing liquid, and no attempt is made to recover the materials scrubbed out, it will of course be economically possible to employ a large excess of water to insure adequate removal of the undesirable materials. However, if it is desired to recover the aldehydes and ketones, or if sulfuric acid or some other more expensive scrubbing liquid is employed, it will be desirable to utilize the minimum quantity for efficient removal of the undesired compounds. In such cases the rate of flow of the scrubbing liquid through the apparatus may be controlled in accordance with the concentration of aldehydes and ketones in the gases leaving the apparatus. However, for this purpose it will usually be sufficient to follow the rate of conversion based on nitric acid secured in recycling the scrubbed gases, since the conversion will be lowered by the presence of water soluble materials in the gases.

The amount of water required per unit volume of gas will of course also depend upon the solubility of the materials being scrubbed out. Thus in the nitration of the higher paraffin hydrocarbons, the higher aldehydes and ketones produced are less water soluble than are the lower molecular weight aldehydes and ketones produced in the nitration of the lower hydrocarbons. However, it will be found that this factor is largely offset by the more efficient removal of the higher molecular weight compounds, by condensation simultaneously with the removal of the nitroparaffins prior to the scrubbing treatment.

The temperature to be employed in the scrubbing operation is not critical and may be varied over a considerable range. Ordinary tap water temperatures are satisfactory for a scrubbing operation, and temperatures of 10–30° C. may satisfactorily be employed both for water scrubbing and for sulfuric acid scrubbing. Increased temperatures in general increase the solubility of the materials which it is desired to scrub out, and for this reason tend to improve the efficiency of the scrubbing operation. However, when employing water as the scrubbing medium, the increased vapor pressure of the aldehydes and ketones tend to offset this advantage. In the case of sulfuric acid scrubbing, the aldehydes and ketones are destroyed by the action of the acid and relatively high temperatures may therefore be employed without danger of aldehydes and ketones being present in the exit gases.

The scrubbing operation may be carried out at atmospheric pressure, or at increased pressures, and may suitably be effected at the pressure employed for the nitration reaction. In such case the entire system may be maintained under the reaction pressure, and the treated gases may then be directly recycled at that pressure. The effect of increased pressure on the scrubbing operation is not pronounced, and is much less than the effect of such increased pressure on the removal of normally liquid products in the initial condensation together with the nitroparaffins. The decrease in concentration of aldehydes and ketones in the gases following condensation at high pressures thus decreases the scrubbing requirements for the complete removal of residual products of this nature.

In scrubbing with sulfuric acid, the concentration of the acid employed may be any concentration sufficiently high to destroy the aldehydes and ketones absorbed in the solution. We have found that concentrations of 25–75%, by weight, are satisfactory for this purpose, but concentrations even outside this range may be employed, if desired. In general, low concentrations require more prolonged contact time of the gases with the scrubbing liquid to insure complete removal of the aldehydes and ketones. As in the case of water scrubbing, the efficiency of the scrubbing operation may be checked by determining the amounts of aldehydes and ketones in the exit gases, or by determining the rate of conversion in the nitration reaction when utilizing recycled gases, and the amount and concentration of the scrubbing liquid may be regulated accordingly.

Our invention may be illustrated by the following specific example:

*Example*

The reaction products from the nitration of propane with nitric acid were passed at 30 lbs. per sq. in. pressure through a condenser maintained at approximately 15° C., to remove the nitroparaffins and the bulk of the water vapor. The resulting gases were then passed successively through two bubble cap columns, through which water was flowed countercurrently to the gas stream. The rate of flow of water was the same in both columns, and the rate of flow of the gases was approximately 40 cu. ft. of gas per gallon of water per hour in each column, or 20 cu. ft. of gas per gal. of water per hour, for the total scrubber. The gases entering the scrubber contained approximately 3.3 g. moles of aldehydes and ketones per 100 cu. ft., and the exit gases contained approximately 0.3 g. moles per 100 cu. ft. The exit gases were then passed through a packed column containing 70% sulfuric acid solution, at the rate of approximately 20 cu. ft. of gas per gallon of scrubbing liquid per hour. The exit gases from this scrubber were found to be free from aldehydes and ketones.

It is to be understood, of course, that the above example is illustrative only and does not limit the scope of our invention. It is evident that the absorption of aldehydes and ketones in the water scrubbing step in the example does not approximate the limit of solubility of these materials, so that with more efficient apparatus, less water would be required per unit volume of gas. Various other modifications of procedure will of course be apparent to those skilled in the art, as for example the use of sulfuric acid scrubbing following only partial scrubbing with water, as would be accomplished in passing the exit gases from the first water scrubber of the example to the sulfuric acid scrubber.

It is also to be understood that our invention is applicable generally to the removal of normally liquid, water soluble materials from the reaction products of the vapor phase nitration of paraffin hydrocarbons, and is not limited to treatment of the specific reaction products employed in the above example. Our invention is particularly adapted to the treatment of the reaction products from the nitration of the lower paraffin hydrocarbons such as ethane, propane, and butane, but is also applicable to vapor phase cyclic processes for the nitration of any of the other paraffin hydrocarbons. Similarly, our water scrubbing procedure may be combined with other steps for the purification of the gases for recycling in nitration reactions, and other scrubbing liquids which will destroy residual aldehydes and ketones may be substituted for the sulfuric acid solution as a secondary scrubbing medium. In general, it may be said that any modifications of procedure, and the use of any equivalents which would naturally occur to those skilled in the art, are included within the scope of our invention.

Our invention now having been described, what we claim is:

1. In a cyclic process for the nitration of lower alkanes, the steps which comprise removing lower nitroalkanes from the gaseous mixture resulting from the nitration of said lower alkanes and subjecting the remaining gases to scrubbing with an aqueous medium, to remove substantially all of the aldehydes and ketones, and introducing the resulting gases into the reaction mixture for the succeeding cycle.

2. In a cyclic process for the nitration of lower alkanes, the steps which comprise removing lower nitroalkanes from the gaseous mixture resulting from the nitration of said lower alkanes and subjecting the remaining gases to water scrubbing at temperatures of 10–30° C. to remove substantially all the aldehydes and ketones, and introducing the resulting gases into the reaction mixture for the succeeding cycle.

3. A cyclic process which comprises nitrating lower alkanes, removing lower nitroalkanes from the gaseous mixture resulting from the nitration of said lower alkanes and subjecting the remaining gases to water scrubbing, followed by sulfuric acid scrubbing to remove substantially all of the aldehydes and ketones, and introducing the resulting gases into the reaction mixture for the succeeding cycle.

4. In a cyclic process for the nitration of paraffin hydrocarbons, the steps which comprise removing lower nitroalkanes from their gaseous mixture resulting from the nitration of said lower alkanes and subjecting the remaining gases to water scrubbing, followed by scrubbing with 25–70% sulfuric acid, to remove substantially all of the aldehydes and ketones, and introducing the resulting gases into the reaction mixture for the succeeding cycle.

5. A cyclic process which comprises nitrating ethane, removing lower nitroalkanes from the gaseous mixture resulting from the nitration of said lower alkane and subjecting the remaining gases to water scrubbing, followed by sulfuric acid scrubbing to remove substantially all of the aldehydes and ketones, and introducing the resulting gases into the reaction mixture for the succeeding cycle.

6. A cyclic process which comprises nitrating propane, removing lower nitroalkanes from the gaseous mixture resulting from the nitration of said lower alkane and subjecting the remaining gases to water scrubbing, followed by sulfuric acid scrubbing to remove substantially all of the aldehydes and ketones, and introducing the resulting gases into the reaction mixture for the succeeding cycle.

7. A cyclic process which comprises nitrating butane, removing lower nitroalkanes from the gaseous mixture resulting from the nitration of said lower alkane and subjecting the remaining gases to water scrubbing, followed by sulfuric acid scrubbing to remove substantially all of the aldehydes and ketones, and introducing the resulting gases into the reaction mixture for the succeeding cycle.

8. In a cyclic process for the nitration of propane, the steps which comprise removing lower nitroalkanes from the gaseous mixture resulting from the nitraion of said lower alkane and subjecting the remaining gases, at temperatures of 10–30° C., to water scrubbing, followed by scrubbing with approximately 70% sulfuric acid to remove substantially all of the aldehydes and ketones, and introducing the resulting gases into the reaction mixture for the succeeding cycle.

JEROME MARTIN.
EDWARD B. HODGE.